June 7, 1960
R. S. RYMER
2,939,773
CHARCOAL LIGHTER
Filed Jan. 23, 1957
2 Sheets-Sheet 1
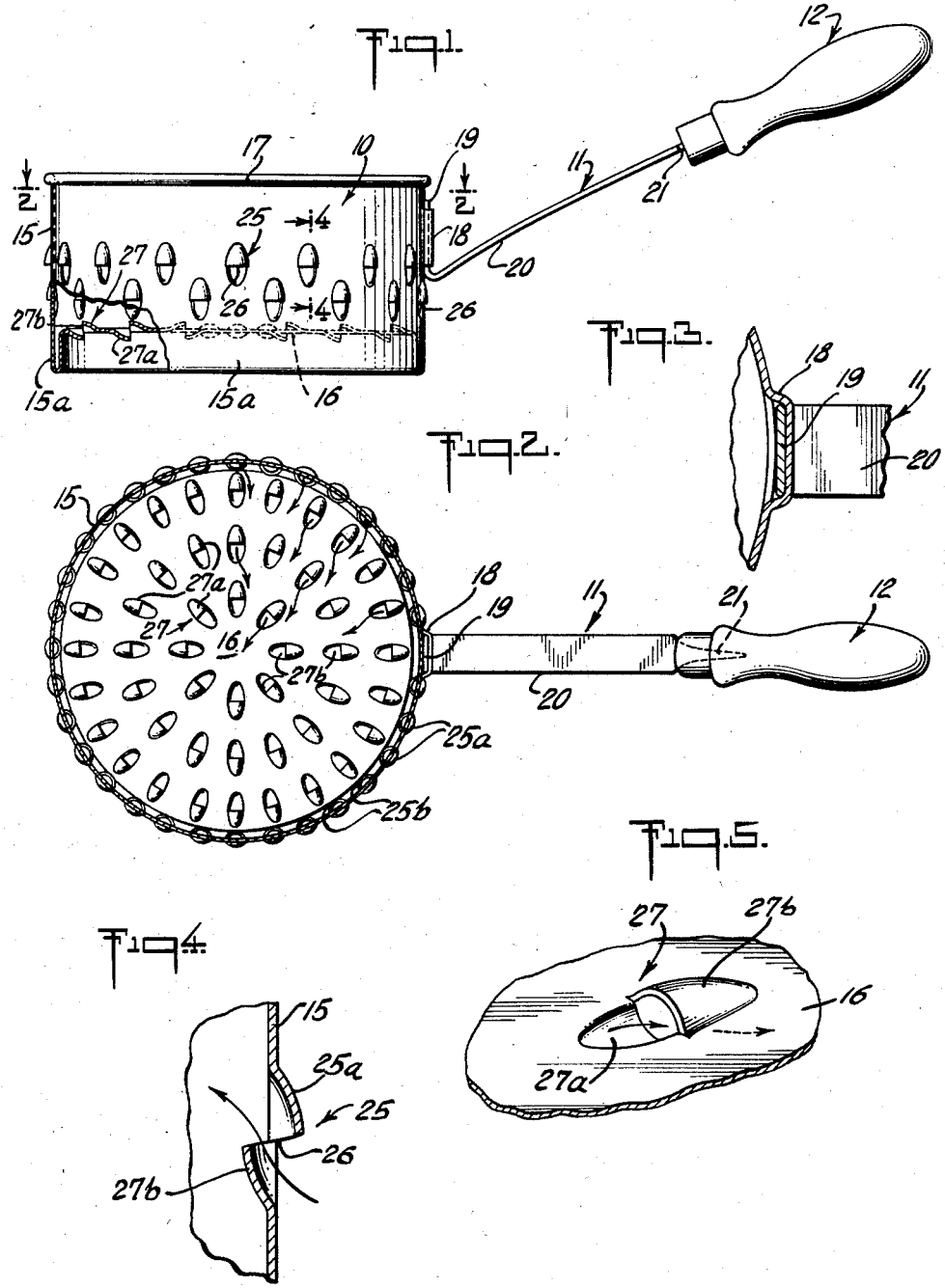
INVENTOR:
RUSSELL S. RYMER
BY
Brown, Jackson, Boettcher & Dienner
ATTORNEYS June 7, 1960  R. S. RYMER  2,939,773
CHARCOAL LIGHTER
Filed Jan. 23, 1957  2 Sheets-Sheet 2
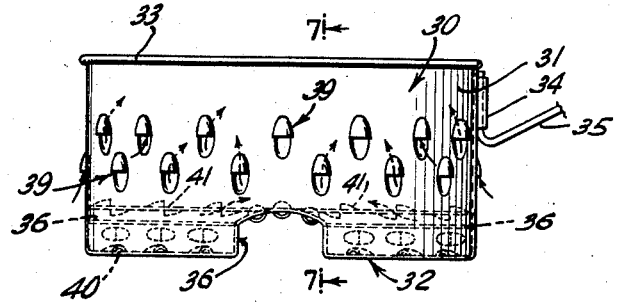
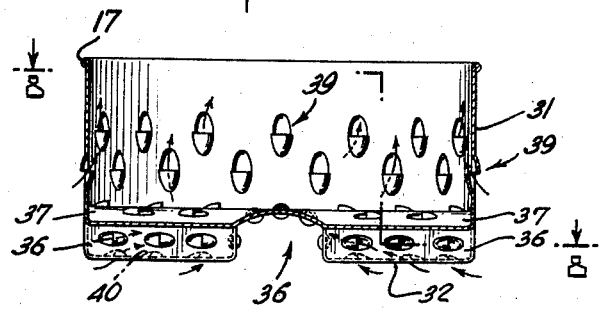
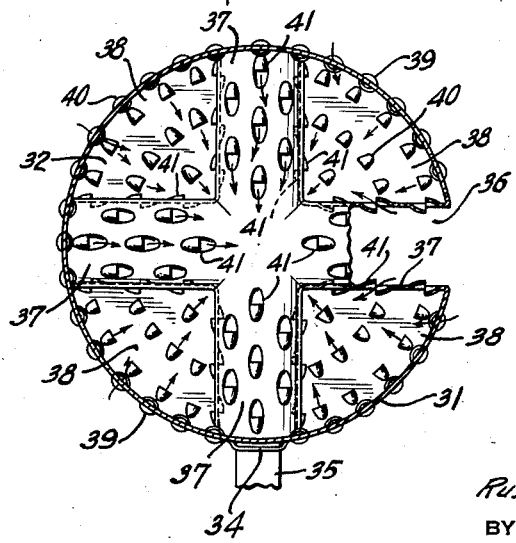
INVENTOR:
RUSSELL S. RYMER
BY
ATTORNEYS:

United States Patent Office 2,939,773
Patented June 7, 1960

2,939,773

CHARCOAL LIGHTER

Russell S. Rymer, Malverne, N.Y., assignor, by mesne assignments, to Associated Ventures, Inc., Denver, Colo., a corporation of Colorado Filed Jan. 23, 1957, Ser. No. 635,625

1 Claim. (Cl. 44—35)

This invention relates to charcoal igniting apparatus and more particularly to an improved device for rapidly and efficiently igniting charcoal and like fuel in a positive and convenient manner.

Recently, barbecued foods have experienced rebirth of popularity in this country. This trend has been particularly prevalent among suburban homeowners where outdoor barbecue pits and grills conveniently may be employed. According to popular practice, natural charcoal or charcoal in briquet form is used to furnish the heat source in the outdoor barbecue grill. A time-honored method of igniting a charcoal fire is to first build a kindling fire upon which charcoal is placed for eventual ignition. More recently, inflammable fluids on the order of kerosene or gasoline have been available for use by the barbecue artist. In using such inflammable fluids, the user saturates the charcoal and ignites the more inflammable liquids which in turn serve to ignite the charcoal. Unless sufficient quantities of the igniting fluid are applied, however, poor and uneven ignition of the charcoal is experienced. Additionally, if a high wind is present, the operator finds it difficult to control the burning of the inflammable ignition fluids, so that too often the ignition fluid burns off before desired ignition of the charcoal occurs. By and large, the igniting of a charcoal fire is a rather unhandy and dirty operation. Particularly, the ignition fluids marketed give rise to objectionable smoke, are explosive, dangerous to store, comparatively expensive, and are not entirely dependable in their operation, unless applied with sufficient quantity to insure a good saturation of the charcoal.

In view of the above factors, I have devised a new and improved device for insuring positive ignition of the charcoal for use in barbecue grills and like devices. My improved means is convenient to use, economical, and free of objectionable smoke and fumes as is experienced in the employment of ignition fluids or kindling fires. Briefly, the igniter means of this invention comprises a basket having a plurality of vent stacks or openings through its side and bottom walls to insure an efficient supply of oxygen to and around the charcoal. The basket is provided with a manually engageable handle means for placing the same on top of a cook stove burner, such as a gas or electric fired burner. The heat of the burner is transmitted to the charcoal within the basket whereby the latter is ignited rapidly and efficiently in minimum time. Upon ignition, the glowing coals are transferred in my igniter to a barbecue grill whereat the contents of the basket are disposed in the grill and surrounded with additional unlighted charcoal which in turn is ignited therefrom.

The main object of this invention is to provide a new and improved device for igniting charcoal and like fuels.

Another object of this invention is to provide a new and improved charcoal lighter which is convenient and efficient to use and is positive in its igniting operation.

Still another object of this invention is to provide an improved charcoal lighter of the character aforesaid, which is employed with a ready source of heat as supplied by a cook stove burner whereby charcoal contained in the igniter may be efficiently and rapidly ignited.

A still additional object of this invention is to provide a charcoal lighter which is clean and dependable in its operation and which embodies improved draft means for effecting rapid ignition of charcoal.

The above and further objects, features and advantages of this invention will appear to those familiar with the art from the following detailed description of a preferred embodiment thereof illustrated in the accompanying drawings.

In the drawings:

Figure 1 is a side-elevational view of the improved charcoal lighter of my invention;

Figure 2 is a cross-sectional view taken substantially along line 2—2 of Figure 1, and looking downwardly at my lighter in the direction of the arrows on such line;

Figure 3 is an enlarged, partial view in cross section showing in detail the means for connecting the handle to the basket means of the lighter shown in Figure 1;

Figure 4 is an enlarged, partial cross-sectional view taken substantially along line 4—4 of Figure 1 to illustrate the features of the improved flue stack means employed in my invention;

Figure 5 is a perspective showing of an improved flue stack means, as seen in Figure 4;

Figure 6 is a partial side-elevational view, similar to Figure 1, showing a first modified form of my improved charcoal lighter;

Figure 7 is a cross-sectional view taken substantially along line 7—7 of Figure 6, and looking in the direction of the arrows thereon; and Figure 8 is a cross-sectional view taken substantially along the line 8—8 of Figure 7, and looking in the direction of the arrows.

Turning now to the features of my charcoal lighter, as illustrated in Figures 1 through 5 of the drawings, it will be recognized that the same comprises a substantially cylindrical open-top metal basket portion 10 having a handle 11 extending outwardly of one side thereof; the handle being fitted with a manually engageable, enlarged grip member 12.

Basket 10 is formed by stamping a sheet metal blank to form a cylindrical side wall 15 which is reentrantly turned inwardly at the lower edge to provide an annular skirt portion 15a and a bottom wall 16 transverse thereto which is inwardly set from the lower edge of the basket. The upper edge of the side wall 15 is rolled over suitably to form a beaded lip 17, as best shown in Figure 1. A U-shaped bracket member 18 is punched from the side wall 15 at one eide of the basket. Such bracket 18 projects radially outward of the basket's side walls to receive a projecting tongue portion 19 formed at one end of the handle member 11. Tongue portion 19 is bent substantially at an acute angle with respect to the axis of the main body portion 20 of the handle 11, and the opposite end of such body portion is formed with a tapered or pointed shank portion 21 for insertion axially into the grip member 12. The tongue portion 19 is removably inserted upwardly into the bracket 18, as viewed in detail in Figure 3, or the same may be rigidly secured to the side walls of the basket 10, if desired, as by rivets or like fastening means.

In operation, the basket 10 is filled with charcoal and placed over an open flame, as for example, a flame provided by the burner of a gas cook stove. It will be understood that by applying the open flame to the charcoal within the basket, the same will be readily ignited in an efficient and smokeless manner. In order to assist the ready ignition of the charcoal in basket 10, I have provided in side walls 15 a plurality of draft ports or flue stacks 25 which are shown in particular detail in Figure 4. The stacks 25 are spaced substantially uniformly in staggered relation about the periphery of the basket, and are formulated by stamping or otherwise deforming the side walls 15 of the basket to provide a pair of oppositely directed semi-conical protruding stack portions 25a and 25b. Stack portions 25a and 25b are integral with the material of the side walls 15, and are separated at their adjacent or opposed ends to formulate a substantially circular throat or vent passageway 26, the axis of which passageway intersects wall 15 at an incline, for the passage of air to the interior of the basket. It will also be seen that while stack portions 25a extend outwardly of the side walls 15, the cooperating portions 25b extend in an opposite direction—or, that is, inward of the side walls 15.

In addition to the several flue stacks 25 in the side walls of the basket 10, I also provide a series of like stacks 27 in the bottom wall 16 of the basket (see Figure 5). In this respect, the flue stacks 27 are formed with semi-conical portions 27a, extending below or beneath the plane of the bottom wall 16 for the basket, and like portions 27b which extend oppositely or upwardly from the plane of bottom wall 16. This relation may best be understood by examining Figure 5 of the drawings. I prefer to formulate the several or plural flue stacks 27 in circular rows concentrically disposed with respect to one another and substantially covering the bottom wall 16 of the basket.

With the presence of the flue stack members 25 and 27, increased draft is admitted to the interior of the basket 10 to permit more rapid ignition of charcoal placed therein. The annular skirt 15a also acts as a flue stack to increase updraft of heated air to the contents of the basket causing better ignition of charcoal in a most efficient manner and in minimum time.

Turning now to the features of the modified form of charcoal lighter illustrated in Figures 6 through 8 of the drawings, it will be understood that a modified basket 30 therein is provided with cylindrical side walls 31, a bottom wall 32, a rolled-over bead or edge 33 along the upper edge of the side walls 31, a bracket means 34 projecting outwardly of the side walls 31, and a handle means 35 fitted into said bracket 34. Generally, the organization for the modified fire lighter basket of Figure 6 is parallel to that previously described.

There are several distinctions between the basket 30 and the basket 10, but in the main, basket 30 in constructed for use with electric stove blurners and the like. In contrast to the unbroken annular skirt 15a of basket 10, four arch-shaped openings 36 are formed through the side walls 31 of basket 30 in diametrically opposed pairs at substantially 90-degree intervals, as best seen in Figure 8. Opposite and extending between such openings 36 are upwardly domed or concave-convex tunnel portions 37 which comprise portions of wall 32. The intersection of the tunnels 37 forms a substantially cross-shaped configuration, as shown in Figure 8, while the domed tunnels 37 and the openings 36 provide additional draft. A basket of this character is especially adapted for use with a burner of an electric cook stove.

It will be particularly recognized that four wedge-shaped wall sections 38 are formed in wall 32 by the intercrossed tunnels 37. Tunnels 37 are fed through the lateral openings 36 and serve as natural flues in transmitting heated air to the charcoal in basket 30.

As in basket 10 first described, basket 30 is equipped along its side walls with a plurality of individual vertical flue stacks 39 similar to the stacks 25 of Figure 4. The bottom wall 32, however, has stack elements 40, which open upwardly only from the bottom face of wall 32. Additional horizontal stacks 41 are provided in the top and side walls of the tunnels 37. All stack openings so provided afford increased draft for more efficient and rapid ignition of charcoal.

While I have herein shown and described my invention in conjunction with a preferred and modified form thereof, it is to be understood that numerous changes, modifications, and substitutions of equivalents may be made therein without necessarily departing from the spirit and scope of the invention involved. As a consequence, it is not my intention to be limited to the particular form of charcoal lighter herein described and shown, except as may appear in the following appended claim.

I claim:

A sheet metal container comprising bottom and side walls adapted to hold charcoal pieces over a heat source, said walls having a plurality of pairs of semi-conical stampings, one element of each pair projecting outwardly and the other inwardly and said elements being juxtaposed, large end to large end, to form a flue stack on an upwardly inclined axis, whereby to direct the flow from the heat source inwardly and upwardly from the exterior of the container to the interior central portion thereof in aid of ignition of the charcoal.

References Cited in the file of this patent

UNITED STATES PATENTS 2,158,236    Haislip                May 16, 1939

FOREIGN PATENTS 526,475    Great Britain          Sept. 19, 1940